(12) United States Patent
Chauvel et al.

(10) Patent No.: US 7,509,391 B1
(45) Date of Patent: Mar. 24, 2009

(54) UNIFIED MEMORY MANAGEMENT SYSTEM FOR MULTI PROCESSOR HETEROGENEOUS ARCHITECTURE

(75) Inventors: Gerard Chauvel, Antibes (FR); Serge Lasserre, Frejus (FR); Dominique Benoit Jacques d'Inverno, Villeneuve Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/448,569

(22) Filed: Nov. 23, 1999

(51) Int. Cl.
*G06F 15/167* (2006.01)

(52) U.S. Cl. .................. 709/214; 709/213; 709/215; 709/216; 711/154; 711/206; 711/207

(58) Field of Classification Search ............... 710/240, 710/8; 711/100, 147, 168, 141, 166, 207, 711/119, 130, 154, 206; 709/200, 213, 214, 709/215, 216; 370/403
See application file for complete search history.

(56) References Cited

U.S. PATENT DOCUMENTS

| | | | | |
|---|---|---|---|---|
| 4,163,280 A | * | 7/1979 | Mori et al. ................... | 711/207 |
| 4,885,680 A | * | 12/1989 | Anthony et al. ............. | 711/144 |
| 5,093,913 A | * | 3/1992 | Bishop et al. ............... | 711/152 |
| 5,437,017 A | * | 7/1995 | Moore et al. ................ | 709/213 |
| 5,442,766 A | * | 8/1995 | Chu et al. .................... | 711/204 |
| 5,463,739 A | * | 10/1995 | Albaugh et al. ............... | 710/6 |
| 5,561,817 A | * | 10/1996 | McCormack et al. ......... | 710/22 |
| 5,623,626 A | * | 4/1997 | Morioka et al. ............. | 711/118 |
| 5,842,226 A | * | 11/1998 | Barton et al. ................ | 711/203 |
| 5,906,001 A | * | 5/1999 | Wu et al. ..................... | 711/154 |
| 6,014,730 A | * | 1/2000 | Ohtsu ......................... | 711/170 |
| 6,163,828 A | * | 12/2000 | Landi et al. .................. | 710/107 |
| 6,202,137 B1 | * | 3/2001 | Ottinger ...................... | 324/300 |
| 6,279,084 B1 | * | 8/2001 | VanDoren et al. ............ | 711/141 |
| 6,351,798 B1 | * | 2/2002 | Aono ............................ | 712/11 |
| 6,378,049 B1 | * | 4/2002 | Stracovsky et al. ............ | 710/8 |
| 6,457,100 B1 | * | 9/2002 | Ignatowski et al. .......... | 711/119 |
| 6,462,745 B1 | * | 10/2002 | Behrbaum et al. ........... | 345/543 |
| 6,501,761 B1 | * | 12/2002 | Pannell et al. ................ | 370/403 |
| 6,604,185 B1 | * | 8/2003 | Fromm ........................ | 711/207 |

FOREIGN PATENT DOCUMENTS

| | | |
|---|---|---|
| EP | 0 374 338 A1 | 6/1990 |
| EP | 0 380 855 | 8/1990 |
| EP | 0 803 820 A2 | 10/1997 |
| GB | 2 171 542 A | 8/1986 |

* cited by examiner

*Primary Examiner*—Jinsong Hu
(74) *Attorney, Agent, or Firm*—Frederick J. Telecky, Jr.; Wade J. Brady, III

(57) ABSTRACT

A multi-processor system 8 includes multiple processing devices, including DSPs (10), processor units (MPUs) (21), co-processors (30) and DMA channels (31). Some of the devices may include internal MMUs (19, 32) which allows the device (10, 21, 30, 31) to work with a large virtual address space mapped to an external shared memory (20). The MMUs (19, 32) may perform the translation between a virtual address and the physical address associated with the external shared memory (20). Access to the shared memory (20) is controlled using a unified memory management system.

17 Claims, 7 Drawing Sheets

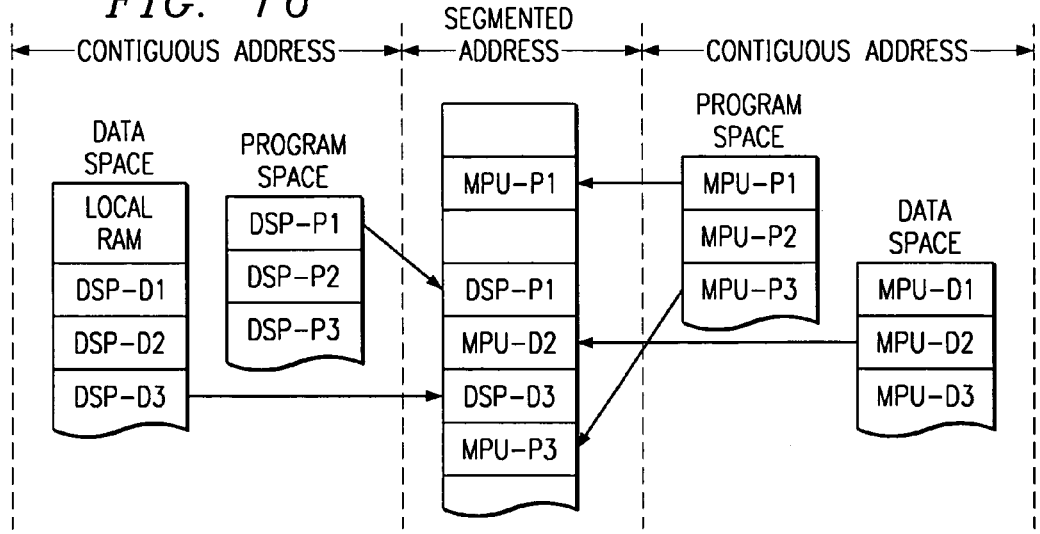

| ACCESS TYPE | ID | Pa | Ba | Ca | Da | Ea | Fa | P | B | C | D | E | F |
|---|---|---|---|---|---|---|---|---|---|---|---|---|---|
| INSTR BUFFER LOAD | 1 | X | | | | | | X | | | | | |
| PROGRAM READ | 2 | | | | X | | | | | | X | | |
| DATA SINGLE READ | 3 | | | | X | | | | | | X | | |
| PERIPH READ | 4 | | | | X | | | | | | X | | |
| PROGRAM WRITE | 5 | | | | | X | | | | | | X | |
| DATA SINGLE WRITE | 6 | | | | | X | | | | | | X | |
| PERIPH WRITE | 7 | | | | | X | | | | | | X | |
| PROGRAM LONG READ | 8 | | | | X | | | | | X | X | | |
| DATA LONG READ | 9 | | | | X | | | | | X | X | | |
| REGISTERS PAIR LOAD | 10 | | | | X | | | | | X | X | | |
| PROGRAM LONG WRITE | 11 | | | | | X | | | | | | X | X |
| DATA LONG WRITE | 12 | | | | | X | | | | | | X | X |
| REGISTERS PAIR WRITE | 13 | | | | | X | | | | | | X | X |
| DATA DUAL READ | 14 | | | X | X | | | | | | X | X | | |
| DATA DUAL WRITE | 15 | | | | | X | X | | | | | X | X |
| DATA SINGLE READ/ DATA SINGLE WRITE | 16 | | | | X | X | | | | | X | X | |
| DATA LONG READ/ DATA LONG WRITE | 17 | | | | X | X | | | | X | X | X | X |
| DUAL READ/COEF READ | 18 | | X | X | X | | | X | X | X | | | |

UNIFIED MEMORY MANAGEMENT SYSTEM FOR MULTI PROCESSOR HETEROGENEOUS ARCHITECTURE

CROSS-REFERENCE TO RELATED APPLICATIONS

Not applicable

STATEMENT OF FEDERALLY SPONSORED RESEARCH OR DEVELOPMENT

Not Applicable

BACKGROUND OF THE INVENTION

1. Technical Field

This invention relates in general to electronic circuits and, more particularly, to digital signal processors.

2. Description of the Related Art

Despite the increasing speed of processors, some emerging applications like video conferencing, digital camera, and new standards in wireless communication supporting more efficient data communication, such as web browsing, will open up new services and therefore enormously increase the MIPS and parallelism requirement for devices. These applications might be executed in separate devices or combined together in the next generation of portable communicators. For these applications, low power consumption and short latency for real time operations are essential.

A single CPU solution with an integrated DSP function, which is the most appealing for the software development, does not seem to be the best trade-off in terms of power consumption and performance. Instead, a multi-processor architecture with heterogeneous processor including an MPU (micro-processor unit), one or several DSPs (Digital signal processors) as well as a co-processor or hardware accelerator and DMA provides significant advantages.

One shortcoming of DSPs is their memory I/O capabilities. Typically, the DSP has an internal memory upon which the DSP relies for storage of data and program information. While improvements in semiconductor fabrication have increased the amount of memory which can be integrated in a DSP, the complexity of the applications has increased the need for instruction and data memory even moreso.

In the future, applications executed by DSPs will be more complex and will likely involve multiprocessing by multiple DSPs in a single system. DSPs will evolve to support multiple, concurrent applications, some of which will not be dedicated to a specific DSP platform, but will be loaded from a global network such as the Internet. These DSP platforms will benefit from a RTOS (real time operating system) to schedule multiple applications and to support memory management to share and protect memory access efficiently between applications and operating system kernels.

Accordingly, a need has arisen for a DSP capable of sophisticated memory management.

BRIEF SUMMARY OF THE INVENTION

In the present invention, a processing system comprises a shared memory and a plurality of processing devices having respective memory management units for controlling access to said shared memory. A global unified memory management system controls access to said shared memory by said memory management units.

The present invention provides significant advantages over the prior art, providing to processing devices such as DSPs, co-processors and DMA channels, with a linear memory space in which to execute independent tasks and the same level of memory protection commonly used in microprocessors. With control of the virtual to physical address translation, the unified memory management system running on a master processing unit can more effectively control the operation of one or more processing devices in a multiprocessor system.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 1b illustrates memory mapping between different devices and a shared memory;

FIG. 2 illustrates a block diagram of the DSP of FIG. 1a;

FIG. 3 illustrates a table showing different bus usages for the DSP of FIG. 2;

DETAILED DESCRIPTION OF THE INVENTION

The present invention is best understood in relation to FIGS. 1-8 of the drawings, like numerals being used for like elements of the various drawings.

Figure 1A:
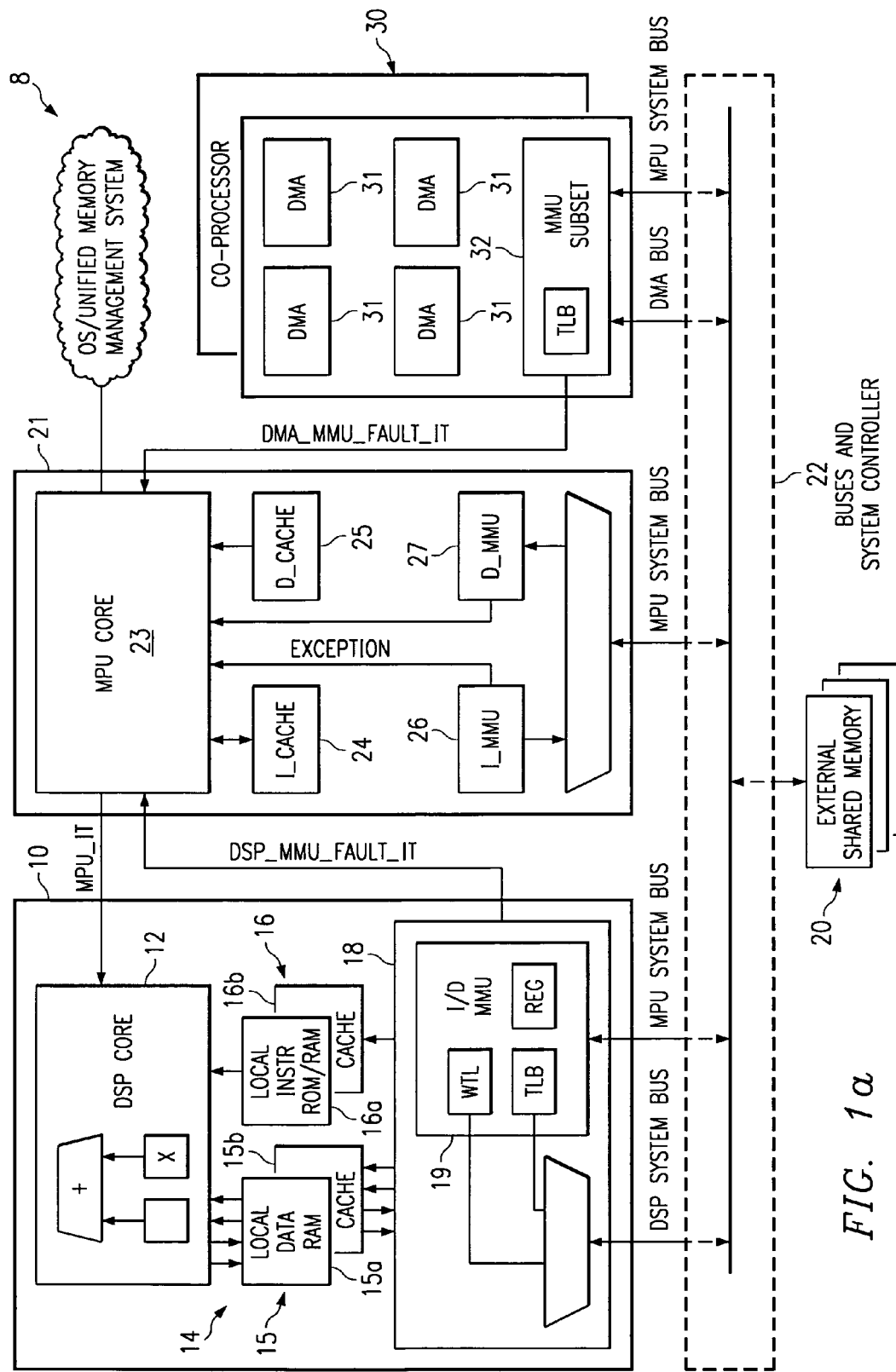
FIG. 1a illustrates a block diagram of a DSP, MPU and co-processor coupled to an external main memory.

FIG. 1a illustrates a general block diagram of a computing device 8 including an improved architecture using DSPs, co-processors and micro-processing units. In this embodiment, the DSP 10 includes a processing core 12 and a plurality of buses 13 coupled to local memory 14, including a data memory (RAM 15a and/or data cache 15b) along with instruction memory 16 (RAM/ROM 16a and/or instruction cache 16b). An external memory interface 18, including MMU (memory management unit) 19 is coupled to buses 13 and to an external physical memory 20 through external bus and memory controller 22.

One or more other processing units (MPUs) 21, external to the DSP 10, are also coupled to memory 20 through external bus and memory controller 22. The processor unit 21, among other tasks, executes the operating system (OS) which supervises the software and hardware of the device 8. The operating system, through processor unit 21, includes a unified memory management system which can control aspects of the MMU 19 to control logical to physical address translation and memory protection, as described in greater detail hereinbelow. Processing unit 21 includes a core 23, instruction cache 24, data cache 25, an instruction memory management unit (MMU) 26 and a data memory management unit (MMU) 27.

One or more co-processors 30 and DMA channels 31 may also be present in the system 8. The co-processors 30 and DMA channels 31 each include an MMU 32 which interfaces with the external shared memory 20 through bus and memory controller 22. As in the case of DSP 10, the unified memory management system of the operating system can control aspects of the physical address translation an memory protection of the MMUs 32 associated with each device.

In operation, the processor core 12 of the DSP can be of any design. Typically, the processing core of a DSP features a high-speed multiplier accumulator circuit (commonly referred to as a "MAC"). The local memory 14 stores data and instructions used in DSP operations. In the illustrated embodiment, the processing core 12 can directly address the local memory 14 using direct address decoding on its virtual addressing for high-speed access. The bus structure is designed to efficiently retrieve and store program and data information from or in local memories 15a/16a or caches 15b/16b; however, different bus structures could also be used. Alternatively, the local memory 14 could be addressed through an MMU, although this would reduce the speed of local memory accesses.

The external memory interface 18 provides the processing core 12 of DSP 10 with the ability to use virtual addressing to access the external memory 20. DSP core 12 accesses the external memory through the MMU 19. DSPs typically include one or more address generation units (AGUs) to perform one or more address calculations per instruction cycle, in order to retrieve instructions and to retrieve and store operands.

The ability to use virtual addressing significantly increases the functionality of a DSP. In particular, a DSP can run independent tasks in a task protected environment. Linear (contiguous) memory space can be allocated to each task, giving the illusion that each task is the only task running in the system. This is key in future systems, as most software will be written by third parties and will not be aware of the other applications. The MMU 18 also provides the capability to extend the addressing range of the DSP 10 from twenty four to thirty-two bits.

The user of virtual addressing also benefits co-processors 30 and DMA channels 31. For a co-processor, running in virtual memory simplifies the drivers. For instance, DMA over multiple pages can be associated with buffer made of scattered pages with the need to be split in several physical DMAs. This is hidden in the translation table management done by the OS for all the system activities. Accordingly, by controlling the translation table, discussed in greater detail below, the need for a complicated software driver for the co-processor 30 or DMA channel 31 is eliminated.

In the illustrated embodiment, the processing unit 21 in conjunction with the operating system provides a unified memory management system which manages and allocates memory dynamically to the different processes running on each processor, co-processor or DSP, providing a linear and protected memory space to all applications (processes). This unified memory management unit provides a linear memory space for all process and all processors (or co-processors and DMAs) despite the non-linear aspect of the corresponding physical addresses in the external shared memory 20. The unified memory management system can also provides an efficient and well-known protection mechanism.

This aspect of the invention is particularly important in the today's computing environment where applications are changing rapidly and are developed by independent companies and individual people. All of these different processes are unaware of other processes, which may be executing concurrently. The same phenomenon is occurring in embedded system design, such as communication devices, where applications will also come from the Internet or another global network.

In FIG. 1a, the operating system, running on the master processing unit 21, has the responsibility for memory management of the entire system 8. The architecture shown in FIG. 1a provides a mechanism to manage, in a simple manner, the memory segmentation occurring in a dynamic system. The present invention allows independent applications to have a contiguous view of their allocated memory without having to worry about other running applications.

As can be seen in FIG. 1b, using virtual addressing, devices in the system can see a contiguous memory space in which to execute their applications. The actual mapping to the external memory 21, however, can be segmented, providing more flexible allocation of the external memory 20.

Each processor (such as DSP 10, processing unit 21 or co-processor 30) can execute its own operating system or real time operating system (RTOS) or even a more basic scheduling function. The processing unit 21 executes the master operating system, including the unified memory management software module. The memory management software module manages several tables containing translations from virtual to physical address and memory protection information.

Figure 2:
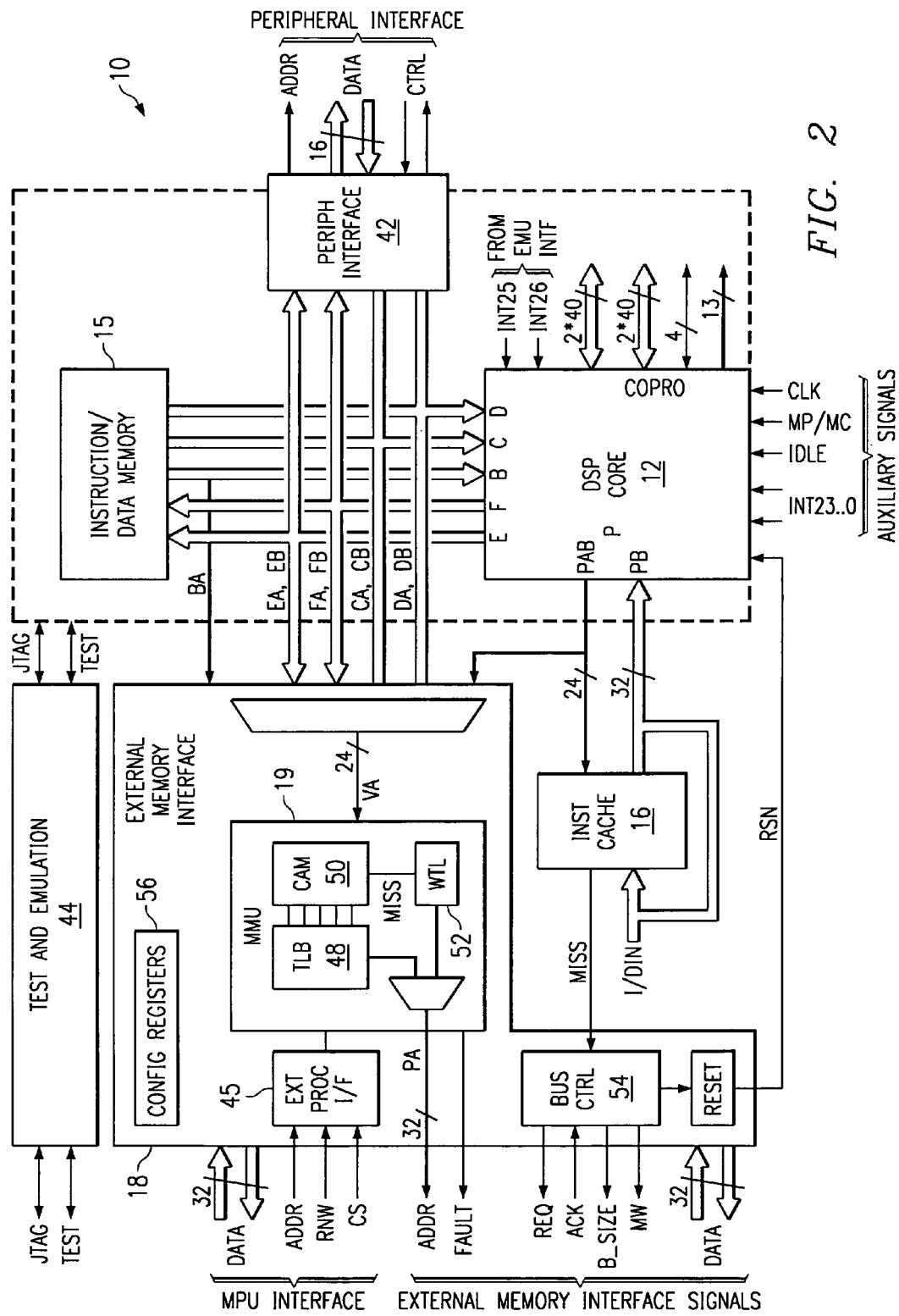

A more detailed description of an embodiment for the DSP 10 is shown in FIG. 2. In addition to the DSP core 12, local data memory 15, local instruction memory 16 and external memory interface 18, the DSP includes a peripheral interface 42, a test and emulation interface 44, and an external processing interface 45. The external memory interface 18 includes an MMU 19 with a translation lookaside buffer (TLB) 48, including a content addressable memory (CAM) 50, and walking table logic (WTL) 52. The external memory interface 18 further includes a bus controller 54, and configuration registers 56.

In operation, the DSP 10 communicates via five interfaces. The external memory interface provides thirty-two bits (byte) address capability for burst or single accesses to an external memory space shared between DSP program and data (and with other processing units). A DSP peripheral interface allows access to peripherals specific to the DSP in I/O space. An auxiliary signals interface regroups reset, clock and interface signals. A test and emulation interface allows test signals and JTAG signals for testing the DSP 10. The external processor interface 45 allows an external processing unit 21 to access information stored in the MMU 19 to control the operation of the MMU 19. The external memory interface 18 controls data and instruction transfers between the DSP 10 and an external memory 20. The external memory interface 18 performs two functions: (1) external memory management, (2) priority handling between multiple DSP buses (labeled C, D, E, F, and P) for external access and cache fill requests.

FIG. 3 illustrates the use of the different buses for each type of instruction from the DSP core 12.

Figure 4:
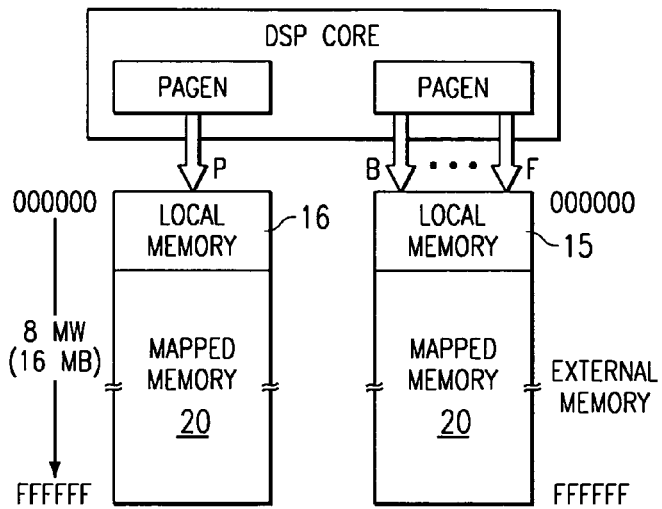
FIG. 4 illustrates program and data spaces for the DSP of FIG. 2.

FIG. 4 illustrates the virtual program and data space. In the illustrated embodiment of FIG. 4, the core 12 sees a uniform 16 Mbyte virtual program space accessed through the P bus. The core 12 accesses 16 Mbytes of contiguous virtual data space through B, C, D, E, F buses, each bus providing its own word address (23 bits). An additional low order bit enables the selection of a byte in a 16-bit data word. A high order D/P bit indicates whether the word is associated with program or data, where data and program buses are multiplexed to an external memory. All buses 13 are 16 bits wide. Sixteen KWords of dual access data RAM (the local data memory 15a) are mapped at the low-end of the address range. The local program memory 16 mapped at the low-end of the program address range can be a RAM/ROM or a cache for storing information (program and data) from the external memory 20.

In the illustrated embodiment, the processing core 12 can directly address the local memory 14 (i.e., without using the MMU 19) within the 16 Mbyte virtual address space for high speed access. External memory 20 is accessed through the MMU 19 in the external memory interface 18.

It should be noted that throughout the specification, specific architectural features and detailed sizes for various memories, bus capacities, and so on, are provided, although the design for a particular DSP implementation could be varied. For example, the size of the virtual program space seen by the core 12 is a design choice, which easily be varied as desired for a specific DSP.

Referring again to FIG. 2, the external memory interface 18 is a 32 bit interface and it generates six types of accesses: (1) single 16-bit data read (word), single 32-bit data read (long word), (2) data burst read m×16-bit data, n×32-bit (long word), (3) data write from DSP (single 16-bit, single 32-bit), (4) data burst write (m×16-bit data, n×32-bit), (5) instruction cache line fill and (6) single instruction fetch. If the DSP has a data cache 15*b*, a data cache line fill is also supported.

The priority scheme is defined to match DSP software compatibility and avoid pipeline, memory coherency and lockup issues. The priority list is, in the illustrated embodiment, from highest to lowest: (1) E requests, (2) F requests, (3) D requests, (4) C requests and (5) Cache fill/instruction fetch requests. To improve DSP data flows to/from external memory, blocks of sequential data can be transferred in burst by configuring the external memory interface.

Figure 5:
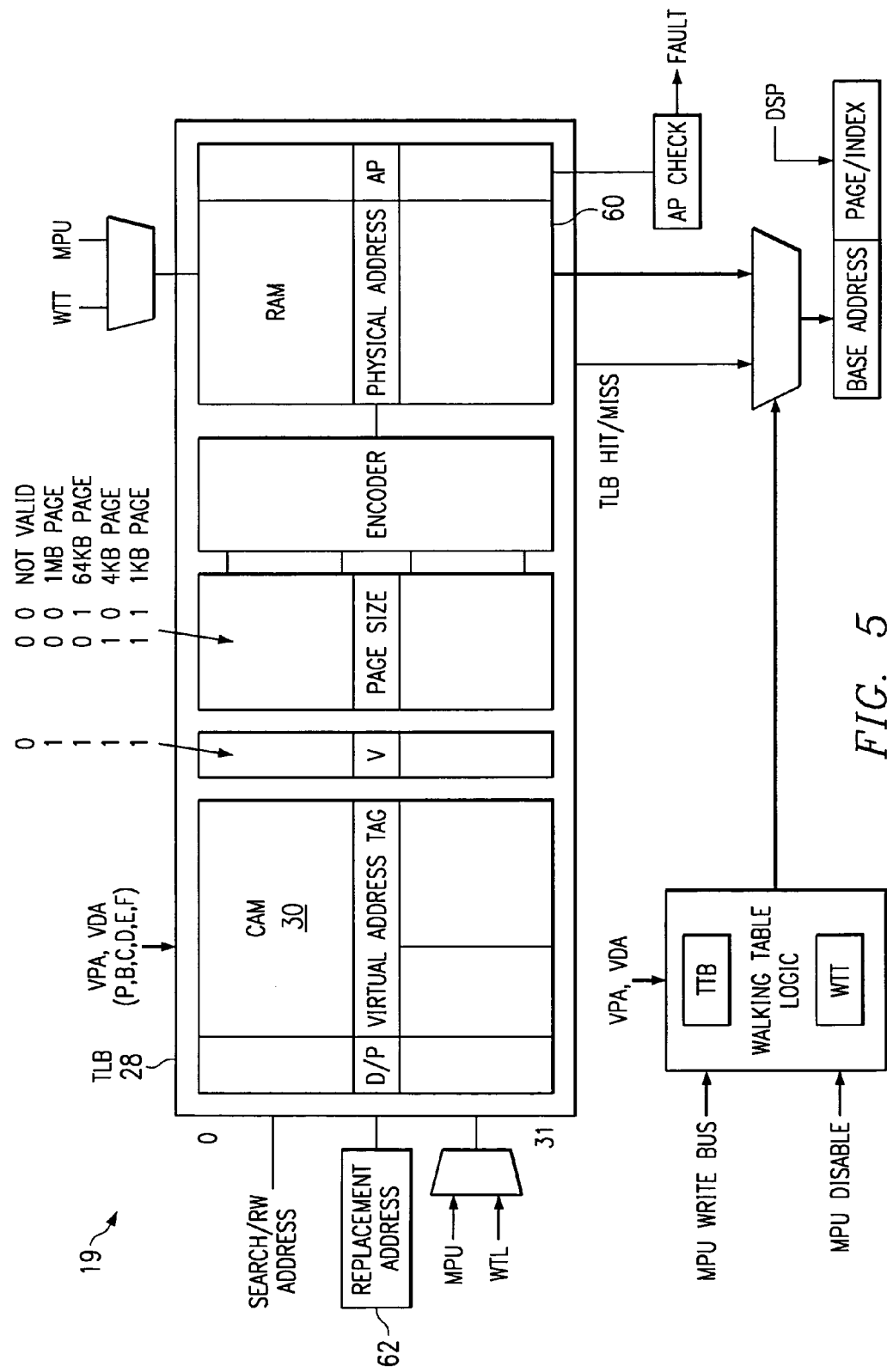
FIG. 5 illustrates a block diagram of the MMU.

The MMU 19 is shown in greater detail in FIG. 5. The MMU 19 performs the virtual address to physical address translations and performs permission checks for access to the external memory interface. The MMU 19 provides the flexibility and security required by an operating system to manage a shared physical space between the DSP 10 and another processing unit.

The MMU includes the TLB 48 and walking table logic 52. In operation, the MMU 19 receives virtual program (instruction) addresses (VPAs) and virtual data addresses (VDAs) from the DSP core 12. The virtual addresses are analyzed by CAM 50 of the TLB 48. If the upper bits of the virtual address are stored within CAM 50, a TLB "hit" occurs. The address in the CAM 50 at which the hit occurred is used to access TLB RAM 60, which stores a physical base address (upper level bits) for each corresponding entry in the CAM 50. Hence, if the virtual address is stored at location "20" of CAM 50, the associated physical address can be obtained from location "20" of RAM 60. The physical base address bits from RAM 60 are then concatenated with page index bits (the lower bits of the virtual address from the DSP core 12) to generate the complete physical address for accessing the external memory 20. In the preferred embodiment, the comparison for each CAM entry is done with the 5, 9, 13, and 15 upper bits of the DSP address, depending upon a page size code (00=1 Mbyte page, 01=64 Kbyte page, 10=4 Kbyte page and 11=1 Kbyte page). Hence, a 1 Mbyte page need only match on the five upper bits, a 64 Kbyte page need only match on the upper nine bits and so on. This is to allow different page sizes to be accommodated by a single CAM; naturally, page sizes other than those shown in FIG. 5 could be used in different implementations.

CAM 50 and RAM 60 can store other information on the virtual addresses. RAM 60 stores permission bits (AP) for the virtual address, which can specify, for example, whether a location is read-only or otherwise protected. These bits can be used to control accesses to certain regions of the external memory 20. When the DSP attempts to access an address with inconsistent AP bits (for example, if the DSP attempts to write to a read only section of memory), the external memory interface 18 generates an interrupt DSP_MMU_fault_IT (see FIG. 1), which is processed by the unified memory management software module running on the master processing unit 21.

If the virtual address from the DSP core 12 is not found in CAM 50, a TLB "miss" occurs. In this case, the walking table logic 52 is used to find the physical address associated with the virtual address via the MMU tables located in external memory.

Figure 6:
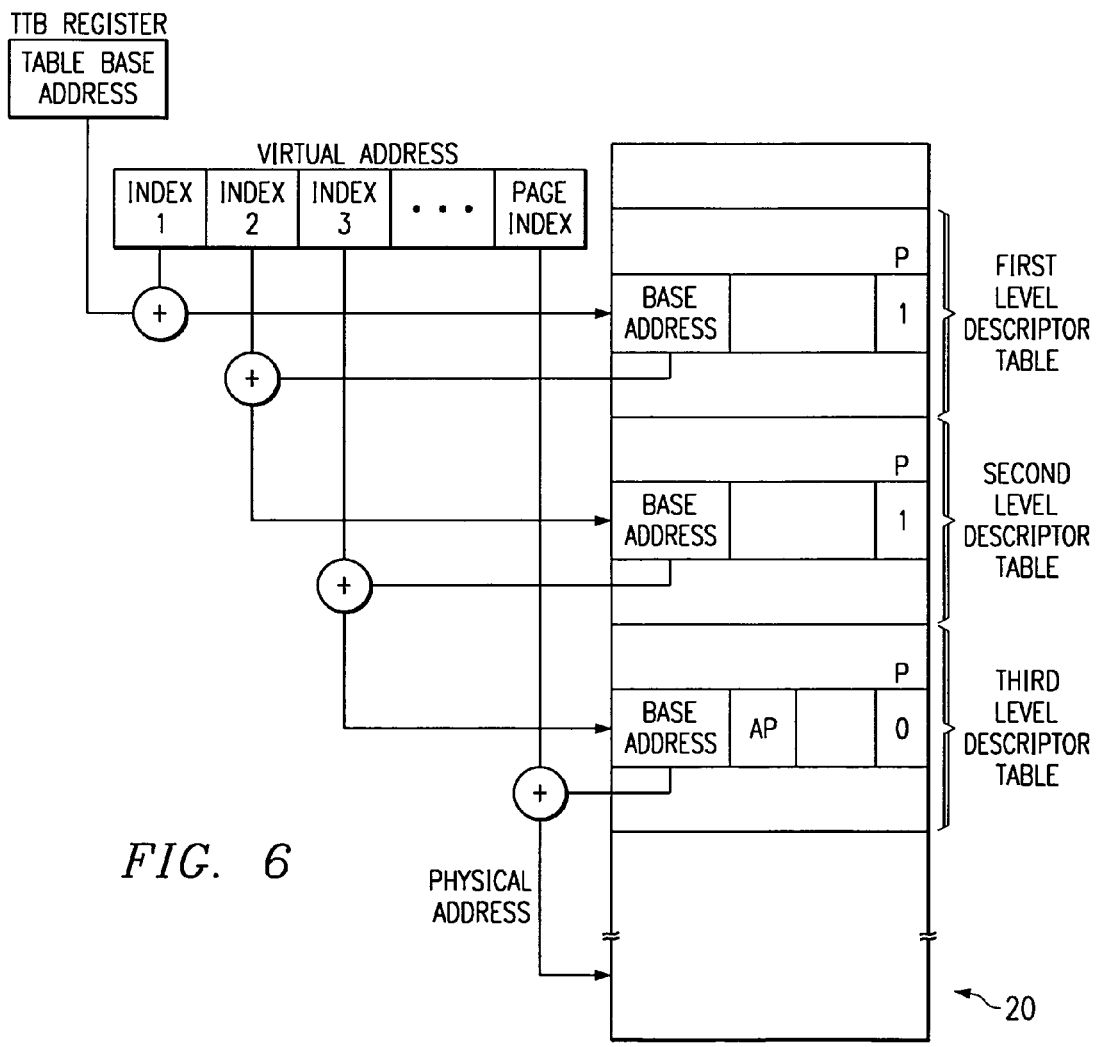
FIG. 6 illustrates the operation of the walking table logic for section of the MMU.

FIG. 6 shows an example of the derivation of a physical address by the walking table logic in the event of a TLB miss. Walking table logic methods are well known in the art and FIG. 6 provides a basic description of the process. The TTB register of the walking table logic 52 holds an address which points to a boundary of a first level descriptor table stored in the external memory 20. The virtual address from the processing core 12 has several index fields, the number and position of which may vary depending upon the page type associated with the virtual address. The translation table base (TTB register) address and index1 from the virtual address are concatenated to identify a location in the first level descriptor table. This location will provide the walking table logic 52 with a base address and a P bit which informs the walking table logic whether the base address points to the physical memory location associated with the virtual address or whether it points to a lower level descriptor table. In the illustration of FIG. 6, the location provides a base address to the second level descriptor table in the external memory 20.

This base address is concatenated with index2 from the virtual address to point to a location within the second level descriptor table. The location provides another base address and another P bit. In the illustration, the P bit indicates that the associated base address points to a location in a third level descriptor table. Thus, the base address is concatenated with index3 from the virtual address to point to a location within the third level descriptor table. This location provides a base address and an associated P bit, which indicates that the base address is associated with the desired physical address. The location also includes the permission bits associated with the physical address. Thus, the base address is concatenated with the page index from the virtual address to access the external memory.

It should be noted that while the example uses three descriptor tables to identify the base address of the desired physical address, any number of tables could be used. The number of tables used to determine a physical address may be dependent upon the page size associated with the physical address.

The base address used to form the physical address and the permission bits are stored in the WTT register of walking table logic 52. The WTT register is used to load the CAM 50 with the virtual address and the RAM 60 with the associated base address and permission bits at a location determined by replacement address circuitry 62. Replacement address circuitry 62 generates programmable random addresses or cyclic addresses. The second replacement policy is important when TLB entries are programmed by the MPU on reception of a TLB miss. The replacement policy can in that case also be bypassed and fully under the control of the MPU.

As an alternative to using the walking table logic 72, the TLB 48 of the DSP 10 could be managed by the processing unit 21. The miss signal from the TLB would be sent to the processing unit 21. The interrupt handler on the processing unit 21 would service the interrupt by walking the tables in external memory 20 to find the correct physical address and loading the DSP's TLB 48 appropriately. While this alternative provides greater flexibility in handling TLB misses, it creates additional time dependencies between the DSP 10 and the processing unit 21.

The capability to control the DSP's translation from logical to physical addresses can be used in many ways. Systems using one or more DSPs can be controlled by a master operating system, executed by one or more of the processors 21. The operating system could, for example, assign different tasks to different DSPs in a system and configure the translation tables in memory 20 appropriately. To improve performance, the TLB of each DSP in a system could be preprogrammed by the operating system to minimize misses.

During the operation of the system 8, many applications may be launched and terminated. As new programs are launched, and others terminated, the allocation of memory space in the external memory can become fragmented, leaving unused blocks of memory. The master processing unit 21, under control of the operating system could review the state of the memory, either periodically or upon an event such as an application launch or termination, to determine the degree of fragmentation. If the memory allocations to the currently running applications needed to be changed, the operating system could interrupt the applications, reallocate the memory and change the TLBs in each DSP or co-processor to reflect the new allocations, change the walking table in the external memory and restart the applications.

Figure 7:
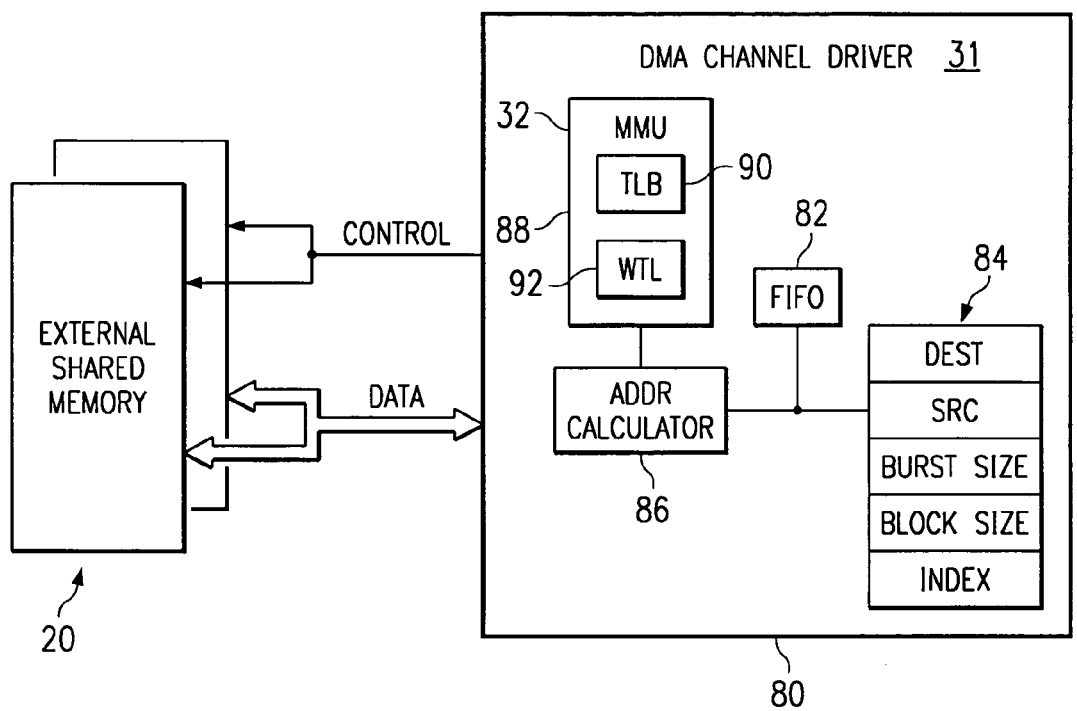
FIG. 7 illustrates a DMA channel driver.

The principle of using an MMU on the DSP can also be extended and applied to using an MMU in conjunction with a DMA channel or co-processor, as is shown in FIG. 7. In order to solve the memory segmentation issue, and to avoid locking, a predefined physical memory space is normally reserved for DMA channels. The size required for DMA buffers is not necessary known during initialization. FIG. 7 shows a single hardware DMA channel hardware block 80 which can be shared by multiple DMA logical channels through a DMA software driver. The DMA driver 80 is reentrant and creates a new logical channel when an application started by a user requires one, all logical channels are queued within the software driver to share the single DMA physical resource in a time-sliced manner. As the DMA driver will be available to the application though APIs, it is impossible to reserve in advance enough space for all possible logical DMA channels. In defining DMA using virtual addresses, the constraint of reserving a sequential memory space for DMA at initialization is eliminated, since a contiguous block of logical addresses can be mapped to the external memory 21 when it is needed. Despite its segmentation, the pool of available memory can be used to create buffers.

In FIG. 7, the DMA hardware block 80 comprises a FIFO (first in, first out) memory 82 (alternatively, a small register file could be used), control registers 84 (including, for example, a destination register, source register, burst size register, block size register, and an index register for complex DMA transfers), address calculator 86 for generating a virtual address, and an MMU 88, including TLB 90 and WTL 92, coupled to the address calculator 86 for generating a physical address to the external memory 20. The architecture of the MMU 88 can be similar to that shown in FIG. 5 for the DSP 10.

In operation, the FIFO memory 82 and the control registers 84 represent one physical DMA channel, although several DMA requests could be queued in the associated DMA software driver. The address calculator 86 calculates addresses from the control register 84 for the next data in a similar fashion to convention DMA controllers; however, the addresses calculated by the address calculator 86 are virtual addresses, rather than physical addresses used for normal DMA transfers, and these virtual addresses can be mapped to any available area(s) of the physical memory 20 by the MMU 88.

If the TLB of the MMU has insufficient entries to support all DMAs, a TLB miss is generated. This miss signal can be sent either to the MPU or it can be handled by the WTL 92 as described in connection with the MMU on the DSP. Sending the miss signal to the MPU 21 gives more control to the DMA driver to optimize the usage of the TLB when there is not enough entries. However, this option adds latency on DMAs, but this is less important because DMAs run in parallel with processor. The replacement policy of TLB entry should be a cyclic (FIFO) replacement in the case of a DMA controller. This, of course, is related to the way that logical DMAs are scheduled in time by the DMA controller.

The MMU hardware block can be further simplified in the case of DMA block by removing the WTL and permission check and replacing them by a simple DMA_MMU_Fault_It interrupt signal (see FIG. 1). The validity of the translation is always guaranteed by the associated DMA software driver during the DMA programming.

Figure 8:
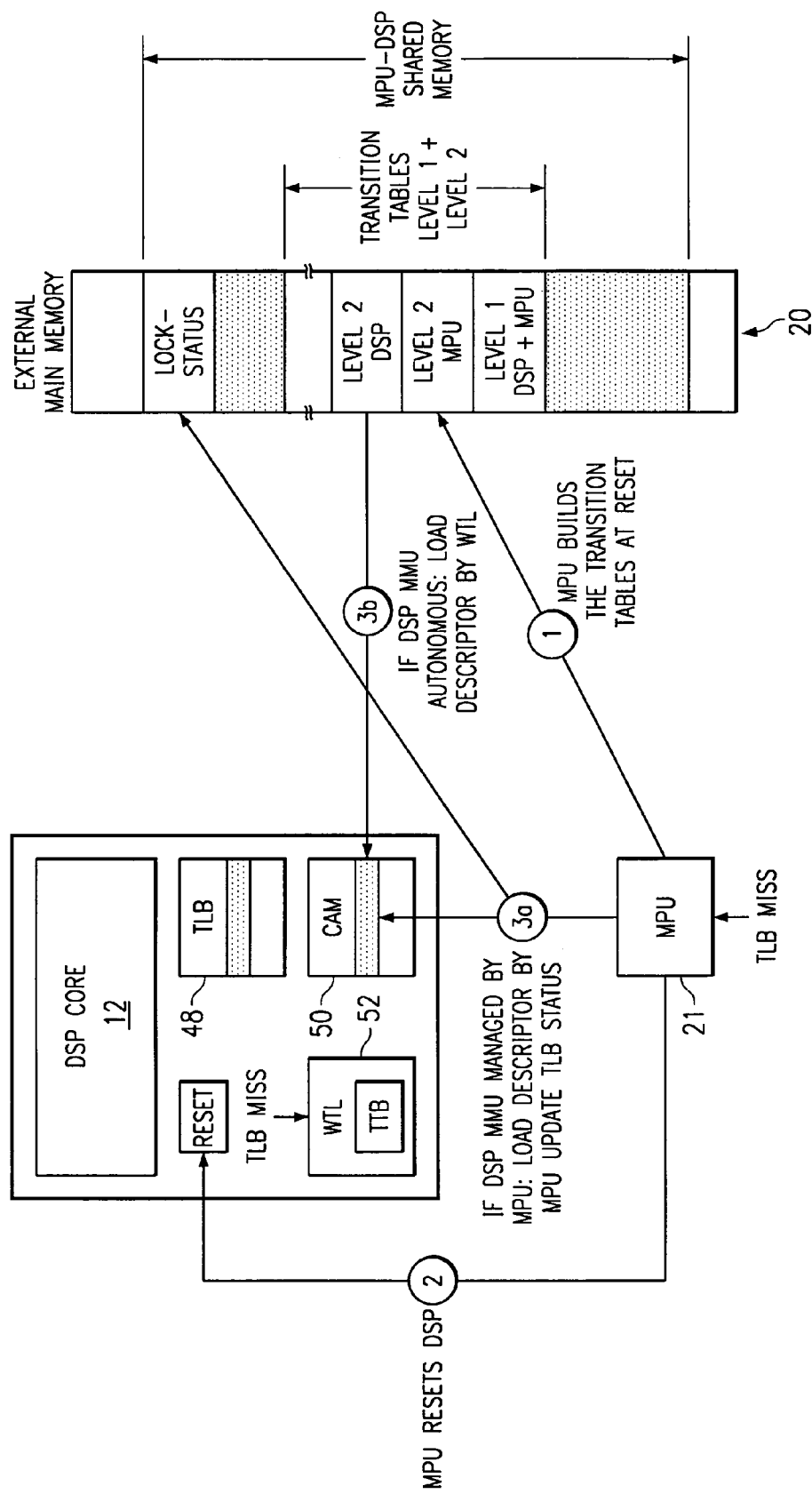
FIG. 8 illustrates an initialization flow for the DSP.

FIG. 8 illustrates operations after reset or before a new process is launched on the DSP 10. First, the master processing unit 21 must create the translation table associated to the process targeted for the DSP 10 in the external memory 20. Once the table is ready, the master processing unit 21 can release the DSP 10 from the reset condition or it can signal the RTOS running on the DSP via a mail box mechanism, indicating to the RTOS that it can schedule the new process. The third step depends on how the TLB 48 of the DSP 10 is managed. In the situation when the processing unit 21 is also managing the TLB loading through the interrupt mechanism, the descriptor is loaded by the processing unit 21 to update the TLB status. When the TLB loads itself randomly, the descriptor is loaded automatically via the WTL 52.

The present invention has been discussed in an embodiment where each processing device in the system has an MMU capable of translating virtual addresses to physical addresses. However, even if one or more devices in the system do not include virtual-to-physical address translation, the unified memory management system could control access to the shared memory by these devices, using access permission and other techniques.

The present invention provides significant advantages over the prior art. With control of the logical to physical address translation an/or access permission using an external processing unit, the operating system allows multiple processing devices to use a shared memory space and more effectively controls the operation of one or more DSPs, co-processors and processing units in a multiprocessor system.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:
1. A multi-processor processing system comprising:
a shared memory for being accessed by multiple devices;
a plurality of processing devices external to said shared memory having respective dedicated memory management units for translating virtual memory addresses, used internally by the processing devices to access locations in said shared memory, to physical memory addresses corresponding to shared memory locations, where the dedicated memory management units each translate according to tables maintained separately from other of the dedicated memory management units; and a global unified memory management system for allocating the shared memory to a plurality of tasks executed on the processing devices, to allocate one or more of the tasks with areas of said shared memory separate from address spaces of shared memory allocated to other tasks.

2. The processing system of claim 1 wherein said unified memory management system performs an access permission check on said physical addresses.

3. The processing system of claim 1 wherein said shared memory contains a translation table maintained by the unified memory management system, where the translation table may be accessed by said memory management units for translating virtual addresses to corresponding physical addresses.

4. The processing system of claim 3 wherein said unified memory management system can control access to said translation table by each memory management unit.

5. The processing system of claim 1 wherein said processing devices include one or more microprocessors.

6. The processing system of claim 5 wherein one or more of said processing devices controls the memory management units of other of said processing devices.

7. The processing system of claim 1 wherein said processing devices include one or more digital signal processors.

8. The processing system of claim 1 wherein said processing devices include one or more co-processors.

9. The processing system of claim 1 wherein said processing devices include one or more DMA channels.

10. A method of operating a multi-processor processing system comprising the steps of:

providing a shared memory for being accessed by multiple devices;

providing a plurality of processing devices external to said shared memory having respective dedicated memory management units for translating virtual memory addresses, used internally by the processing devices to access locations in said shared memory, to physical memory addresses corresponding to shared memory locations, where the dedicated memory management units each translate according to tables maintained separately from other of the dedicated memory management units; and allocating the shared memory to a plurality of tasks executed on the processing devices through a unified memory management system, to allocate one or more of the tasks with areas of said shared memory separate from address spaces of shared memory allocated to other tasks.

11. The method of claim 10 and further comprising the step of performing an access permission check on said physical addresses.

12. The method of claim 10 wherein said allocating step comprises the step of maintaining entries in a translation table which may be accessed by said memory management units for translating virtual addresses to corresponding physical addresses with said unified memory management system.

13. The method of claim 10 wherein said step of providing processing devices comprises the step of providing one or more microprocessors.

14. The method of claim 13 wherein said step of providing processing devices comprises the step of providing one or more digital signal processors.

15. The method of claim 13 wherein said step of providing processing devices comprises the step of providing one or more co-processors.

16. The method of claim 13 wherein said step of providing processing devices comprises the step of providing one or more DMA channels.

17. A multi-processor processing system comprising:

a shared memory for being accessed by multiple devices;

a plurality of processing devices external to said shared memory having respective dedicated memory management units for translating virtual memory addresses, used internally by the processing devices to access locations in said shared memory, to physical memory addresses corresponding to shared memory locations, where the dedicated memory management units each translate according to tables maintained separately from other of the dedicated memory management units and wherein one or more of said processing devices controls the memory management units of other of said processing devices; and a global unified memory management system for allocating the shared memory to a plurality of tasks executed on the processing devices, to allocate one or more of the tasks with areas of said shared memory separate from areas of shared memory allocated to other tasks.

* * * * *